Sept. 28, 1943.　　　C. A. CLARKE　　　2,330,406
MINIATURE CAMERA
Filed Sept. 25, 1940
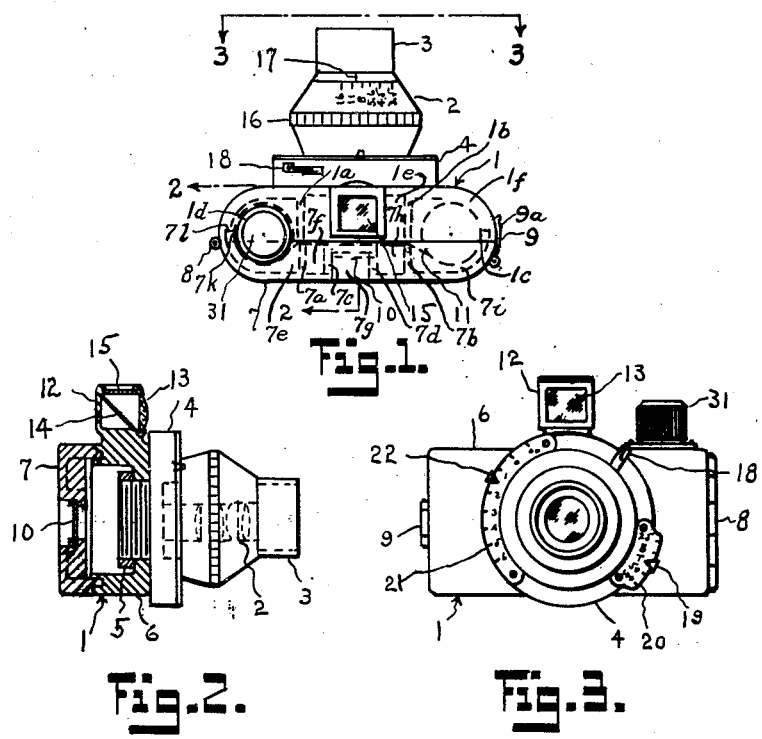
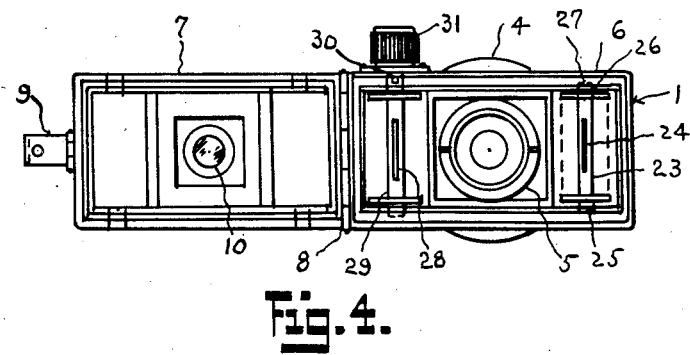
INVENTOR.
Charles A. Clarke Patented Sept. 28, 1943

2,330,406

UNITED STATES PATENT OFFICE 2,330,406

MINIATURE CAMERA

Charles A. Clarke, New York, N. Y.

Application September 25, 1940, Serial No. 358,328

1 Claim. (Cl. 95—31)

My invention relates to cameras and refers more particularly to miniature cameras.

One object of my invention is to provide a miniature camera that can be carried in the palm of the hand and one that will be cheap to manufacture and operate.

Another object of my invention is to provide a miniature camera provided with a fast lens, so that pictures can be taken under adverse conditions.

A further object of my invention is to provide a miniature camera using a 16 m.m. film that can be loaded by anybody, wherein the negatives are cheap and can be enlarged very much.

A still further object of my invention is to provide a miniature camera with a cheap film and a lens 16 times faster than a meniscus so that pictures, small and accurate, can be made in a poor light.

I attain these results preferably by the means illustrated in the accompanying drawing, wherein similar numerals refer to like parts throughout the several views, in which:

Figure 1 is a plan of the camera.

Figure 2 is a partial section taken on lines 2—2 of Figure 1.

Figure 3 is a front elevation of the camera.

Figure 4 is a rear elevation of the camera with the door open.

The camera 1 has a case 6 hinged at 8 to a cover 7, and on this cover is a latch 9 engageable with a lug 9a on the case.

The case 6 is partitioned at 1a and 1b, which partitions extend to the dividing line 1c between the case 6 and cover 7 where the cover 7 meets the case 6 when the camera is closed.

The partitions 1a and 1b provide three compartments in the case 1d, 1e and 1f, the compartment 1d adapted to hold a spool 29 and the compartment 1f adapted to hold a spool 23, both of which spools have a slot 27.

The slot 27 is engageable with a projection 30 that is a part of the knob 31, the function of which is to provide a means for turning the spool in one direction only.

The compartment 1f is adapted to hold a full spool 23 that is freely revolvable in suitable slots in the case 1 and the spool 29 is connected to the end of the film.

The compartment 1c between 1d and 1f is provided with an opening to hold the lens 2 by means of the nut 5 with a shutter 4, sun shield 3 which together comprise the lens unit that is detachably held to the case 1.

The cover is divided into five compartments by the partitions 7a, 7b, 7c and 7d, providing compartments 7e, 7f, 7g, 7h, and 7i, the compartments 7e and 7i providing room for the spools 23 and 29 when the cover is closed and the partitions 7a and 7b register in spaced relation with the partitions 1a and 1b in the case.

The tongue 7k in the cover engages with the indentation 7l in the case and provides the interlocking means.

The partitions 7c and 7d contain a colored glass window 10 that is adjacent to the dividing line between the case and the cover through which the number of the film 11 may be observed.

On the top of the case 1, is attached a reflection finder 12, comprised of a lens 13, a right angled mirror 14, and a suitable glass 15 upon which the view will be seen.

The lens 2 is operated by the knurled part 16, which allows the lens to be set to 16—11—8—5.6—4.5— and 3.5 upon the line 17 and the shutter 4, operated by the lever 18, which can be positioned to work at 25—50—100 and bulb or time, as shown by the regulator 19, and scale 20, furthermore there are means to set the shutter to operate under various conditions such as for portraits, average views, distant views, etc., as shown by the scale 21 and indicator 22.

The film is on the spool 23 with the slot 24, and is provided with projections 25 and 26, one of which has a slot 27, which projections fit into the slots in the body 1.

The end of the film is attached to the slot 28, of the spool 29, and the slot 27 of this spool engages the projection 30 of the handle 31, which has a pawl and ratchet, not shown, so that it can turn only in one direction.

Having thus illustrated and described the preferred embodiment of my invention, I do not wish to limit myself to the exact construction or arrangement of parts shown, since it is evident that modifications may be made therein without departing from the spirit of the invention or scope of the claim.

I claim:

In a miniature camera, a rectangular case, a hinger cover on said case, a latch on said cover engaging a lug on said case, the ends of said case and cover rounded into each other, means interlocking the cover with the case, said case partitioned into three compartments comprising two relatively small film compartments and a lens compartment, the partitions of said lens compartment flush with the dividing line between said case and cover, partitions in the said cover compartment registering in spaced relation to the partitions in the case, a knob with a split shaft projecting into one of the film compartments, said knob provided with means for rotation in one direction only, a fast lens and a shutter mounted on the centerline of said lens compartment and a reflector finder mounted on the top of said case directly over the centerline of said lens.

CHARLES A. CLARKE.